(12) United States Patent
Manley et al.

(10) Patent No.: US 12,299,491 B2
(45) Date of Patent: May 13, 2025

(54) SYSTEM AND METHOD FOR DYNAMIC RESOURCE ALLOCATION DURING DATA BACKUP/RESTORE

(71) Applicant: Druva Inc., Sunnyvale, CA (US)

(72) Inventors: Stephen Manley, Livermore, CA (US); Preethi Srinivasan, Sunnyvale, CA (US); Ritesh Singh, Jamshedpur (IN); Ajay Potnis, Pune (IN)

(73) Assignee: Druva Inc., Santa Clara, CA (US)

( * ) Notice: Subject to any disclaimer, the term of this patent is extended or adjusted under 35 U.S.C. 154(b) by 592 days.

(21) Appl. No.: 17/552,191

(22) Filed: Dec. 15, 2021

(65) Prior Publication Data

US 2023/0185619 A1 Jun. 15, 2023

(51) Int. Cl.
| | |
|---|---|
| *G06F 9/50* | (2006.01) |
| *G06F 11/14* | (2006.01) |
| *G06F 11/34* | (2006.01) |

(52) U.S. Cl.
CPC ............ *G06F 9/5038* (2013.01); *G06F 9/505* (2013.01); *G06F 11/1451* (2013.01); *G06F 11/1458* (2013.01); *G06F 11/1461* (2013.01); *G06F 11/1464* (2013.01); *G06F 11/1469* (2013.01); *G06F 11/3419* (2013.01)

(58) Field of Classification Search
None
See application file for complete search history.

(56) References Cited

U.S. PATENT DOCUMENTS

| | | | |
|---|---|---|---|
| 8,887,166 B2 * | 11/2014 | Gerovac | H04L 47/762 711/170 |
| 11,909,814 B1 * | 2/2024 | Truelove | H04L 67/1012 |
| 2004/0073673 A1 * | 4/2004 | Santos | H04L 67/10 709/226 |
| 2014/0089511 A1 * | 3/2014 | McLean | G06F 9/5061 709/226 |
| 2015/0286430 A1 * | 10/2015 | Dain | G06F 11/1448 711/103 |
| 2019/0012203 A1 * | 1/2019 | Kochunni | G06F 9/5011 |
| 2019/0370133 A1 * | 12/2019 | Salapura | G06F 12/02 |
| 2020/0133783 A1 * | 4/2020 | Kumar | G06F 11/349 |
| 2020/0319799 A1 * | 10/2020 | Mayer | G06F 3/061 |
| 2020/0410418 A1 * | 12/2020 | Martynov | G06F 16/122 |
| 2021/0258267 A1 * | 8/2021 | Vishwakarma | G06N 3/043 |
| 2023/0051637 A1 * | 2/2023 | Seshadri | G06F 11/1461 |

\* cited by examiner

*Primary Examiner* — Abu Zar Ghaffari
(74) *Attorney, Agent, or Firm* — IceMiller LLP

(57) ABSTRACT

A resource allocation map generator generates a resource allocation map for a current data backup and/or restore based on a mathematical model, real-time operating data corresponding to operating states of one or more resources, and historical data corresponding to data back-up and restore of one or more historical datasets. A resource allocation recommender generates a recommendation for resource allocation for the current data backup and/or restore based on the resource allocation map and a threshold value corresponding to a particular resource. A resource allocator dynamically initiates a change in resource allocation based on the generated recommendation.

10 Claims, 5 Drawing Sheets

SYSTEM AND METHOD FOR DYNAMIC RESOURCE ALLOCATION DURING DATA BACKUP/RESTORE

BACKGROUND

Embodiments of the present invention generally relate to systems and methods for data backup and/or restore, and more particularly to systems and methods that enable dynamic resource allocation during data backup and/or restore.

Enterprises these days seek reliable, cost-effective ways to protect the data stored on their computer networks while minimizing the impact on productivity. An enterprise might back up critical computing systems such as databases, file servers, web servers, virtual machines, and so on as part of a daily, weekly, or monthly maintenance schedule. In the event of data loss, data corruption, and/or other disaster-related occurrences, the backed-up data may be restored to the primary data source or another restore destination. However, current methods and systems for data backup and/or restore typically do not provide for dynamic reallocation of resources during the data backup and/or restore.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for dynamic resource allocation during a data backup and/or restore of a backup data in a data backup and/or restore environment is presented. The system includes a resource allocation map generator configured to generate a resource allocation map for the current data backup and/or restore based on a mathematical model, real-time operating data corresponding to operating states of one or more resources in the data backup and/or restore environment, and historical data corresponding to data back-up and restore of one or more historical datasets. The system further includes a resource allocation recommender configured to generate a recommendation for resource allocation for the current data backup and/or restore based on the resource allocation map and a threshold value corresponding to a particular resource. The system moreover includes a resource allocator configured to dynamically initiate a change in resource allocation based on the generated recommendation.

According to another example embodiment, a system for dynamic resource allocation during a data backup and/or restore of a backup data in a data backup and/or restore environment is presented. The system includes a memory storing one or more processor-executable routines, and a processor communicatively coupled to the memory. The processor is configured to execute the one or more processor-executable routines to receive real-time operating data corresponding to operating states of one or more resources in the data backup and/or restore environment; generate a resource allocation map for the current data backup and/or restore based on a mathematical model, the real-time operating data, and historical data corresponding to data back-up and restore of one or more historical datasets; generate a recommendation for resource allocation for the current data backup and/or restore based on the resource allocation map and a threshold value corresponding to a particular resource, and dynamically initiate a change in resource allocation based on the generated recommendation.

According to another example embodiment, a method for dynamic resource allocation during a data backup and/or restore of backup data in a data backup and/or restore environment is presented. The method includes receiving real-time operating data corresponding to operating states of one or more resources in the data backup and/or restore environment. The method further includes generating a resource allocation map for the current data backup and/or restore based on a mathematical model, the real-time operating data, and historical data corresponding to data back-up and restore of one or more historical datasets. The method furthermore includes generating a recommendation for resource allocation for the current data backup and/or restore based on the resource allocation map and a threshold value corresponding to a particular resource. The method moreover includes dynamically initiating a change in resource allocation based on the generated recommendation.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
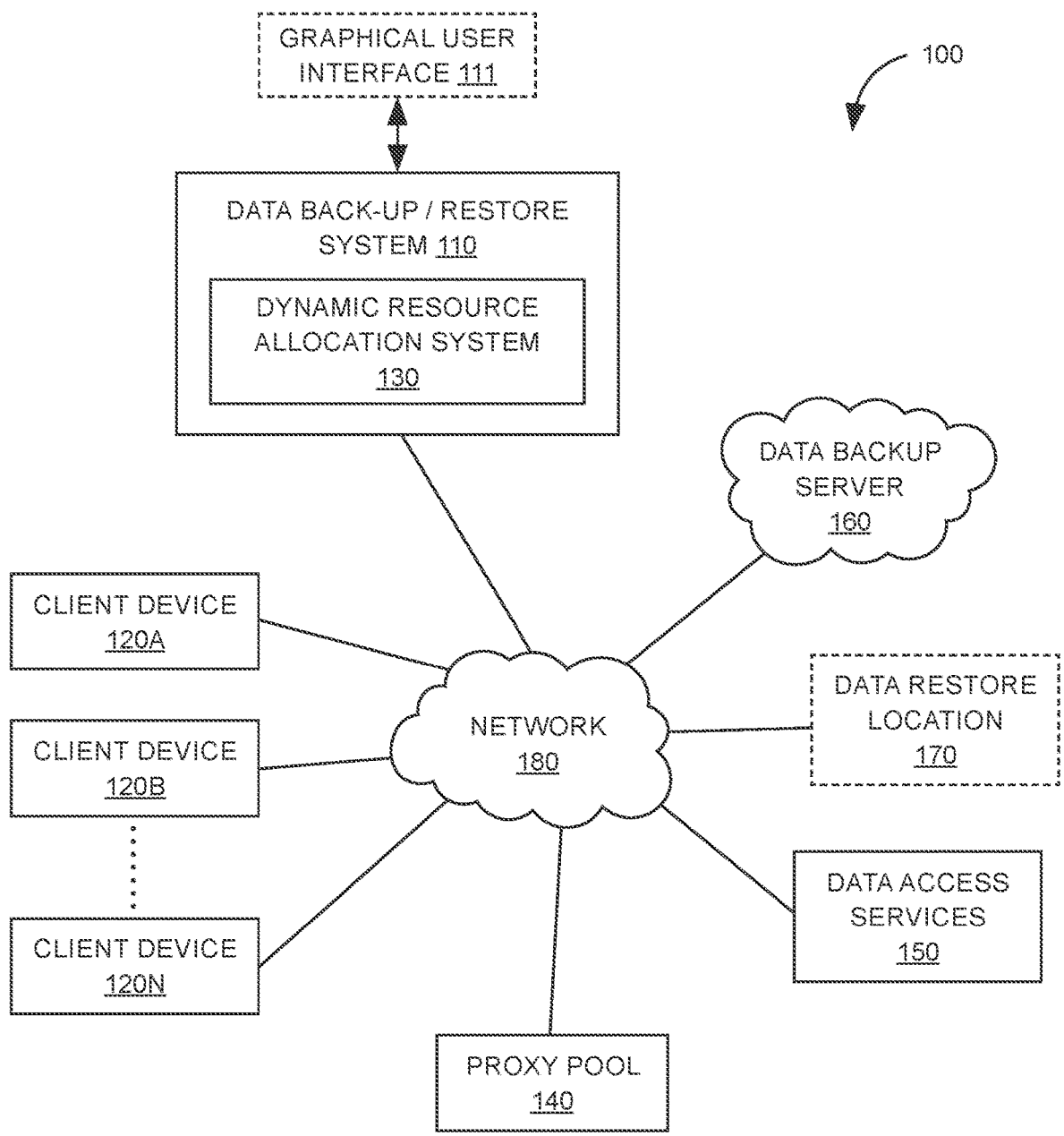
FIG. 1 is a block diagram illustrating an example data backup/restore system environment, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for dynamically allocating resources during a data backup and/or restore.

FIG. 1 illustrates an example data backup/restore system environment 100, in accordance with some embodiments of the present description. The data backup/restore system environment 100 includes a data backup/restore system 110, one or more client devices 120 (120A, 120B . . . 120N), a dynamic resource allocation system 130, a proxy pool 140, data access services 150, and data backup server 160, and optionally a restore location 170 (during a data restore scenario). The data backup/restore system environment 100 may be configured to back up data from the one or more client devices 120 in the data backup server 160 using the data backup system 110 and the proxy pool 140. Alternately, the data backup/restore system environment 110 may be configured to restore data from the data backup server 160 to a restore location 170 using the data backup system 110 and the proxy pool 140. Examples of data to be backed up/restored include, but are not limited to, a text file, an image file, an audio clip, a video clip, an email, a data file, or any combination thereof.

The data backup/restore system 110 may be a software or a hardware component that enables the one or more client devices 120 to back up or restore data, and optionally search and access the backup data. In some embodiments, the data backup/restore system 110 is a cloud-based service. As described in detail later, the data backup/restore system 110 further includes a dynamic resource allocation system 130 configured to dynamically allocate resources during a data backup/restore.

The data backup/restore system 110 may optionally further provide a graphical user interface 111 for individual clients to control the data backup/restore process. For example, a graphical user interface 111 may be a front-end cloud storage interface. Additionally, or the data backup/restore system 110 may provide APIs for the access and management of files from the data backup server 160.

The one or more client devices 120 (referred to herein as "device") may be any computing devices that have data that may need backup. Examples of such devices 120 include without limitation, workstations, personal computers, desktop computers, or other types of generally fixed computing systems such as mainframe computers, servers, and minicomputers. Other examples of such devices 120 include mobile or portable computing devices, such as one or more laptops, tablet computers, personal data assistants, mobile phones (such as smartphones), IoT devices, wearable electronic devices such as smartwatches, and other mobile or portable computing devices such as embedded computers, set-top boxes, vehicle-mounted devices, wearable computers, etc. Servers can include mail servers, file servers, database servers, virtual machine servers, and web servers.

In some embodiments, the data backup/restore system environment 100 includes a plurality of devices 120. The plurality of devices 120 may be from a single client or from different clients being serviced by the data backup/restore system 110 such as shown in FIG. 1. In some embodiments, the data backup/restore system environment 100 includes a single device 120 having a plurality of data sets or one large data set that needs to be backed up/restored.

The data backup/restore system environment 100 further includes the proxy pool 140 and cloud access services 150. The proxy pool 140 is a collection of backup/restore proxies. The data backup/restore system 110 is configured to backup/restore data to the data backup server 160 or the restore location 170 by using the proxy pool 140 including a plurality of proxies.

In some embodiments, the data backup server 160 is a cloud-based storage. The data sets from the one or more devices 120 may be stored and backed up in an object-based storage, a file-based storage, or a block-based storage. Non-limiting examples of suitable data backup servers to implement data backup 160 include those provided by AMAZON S3™, RACKSPACE™ CLOUD FILES, AZURE™ BLOB STORAGE, and GOOGLE™ CLOUD STORAGE services.

The restore location 170 may be packaged/configured with the client device 120 (e.g., an internal hard disk) and/or may be external and accessible by the client device 120 (e.g., network-attached storage, a storage array, etc.). Non-limiting examples of the restore location 170 may include, without limitation, disk drives, storage arrays (e.g., storage-area network (SAN) and/or network-attached storage (NAS) technology), semiconductor memory (e.g., solid-state storage devices), network-attached storage (NAS) devices, tape libraries, or other magnetic, non-tape storage devices, optical media storage devices, or combinations thereof. In some embodiments, the restore location 170 is provided in a cloud storage environment (e.g., a private cloud or one operated by a third-party vendor). In embodiments where the restore location 170 is a storage system internal to the client device 120, the block representing the restore location 170 may be present in the client device 120 itself.

The various components in the data backup/restore system environment 100 may communicate through the network 180 and/or locally. It should be noted that although a single block 180 is shown to represent a network in FIG. 1, the system environment 100 may include a plurality of networks 180 to connect different components of the system environment 100. For example, in some embodiments, one of the system components may communicate locally with the data backup/restore system 110, while other components communicate with the data backup/restore system 110 through the networks. In other embodiments, every component in the data backup/restore system environment 100 is online and communicates with each other through the network 180. In one embodiment, the network 180 uses standard communications technologies and/or protocols. Thus, the network 180 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 180 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

While the data backup/restore system 110, the dynamic resource allocation system 130, the proxy pool 140, the data access services 150, the data backup server 160, and the restore location 170 are each represented by a single block in FIG. 1, each of these components may include multiple distributed and/or independent computers (may also be referred to as workers) working cooperatively and in parallel with other computers so that the operation of the entire system will not be affected when one or more workers are down.

Figure 2:
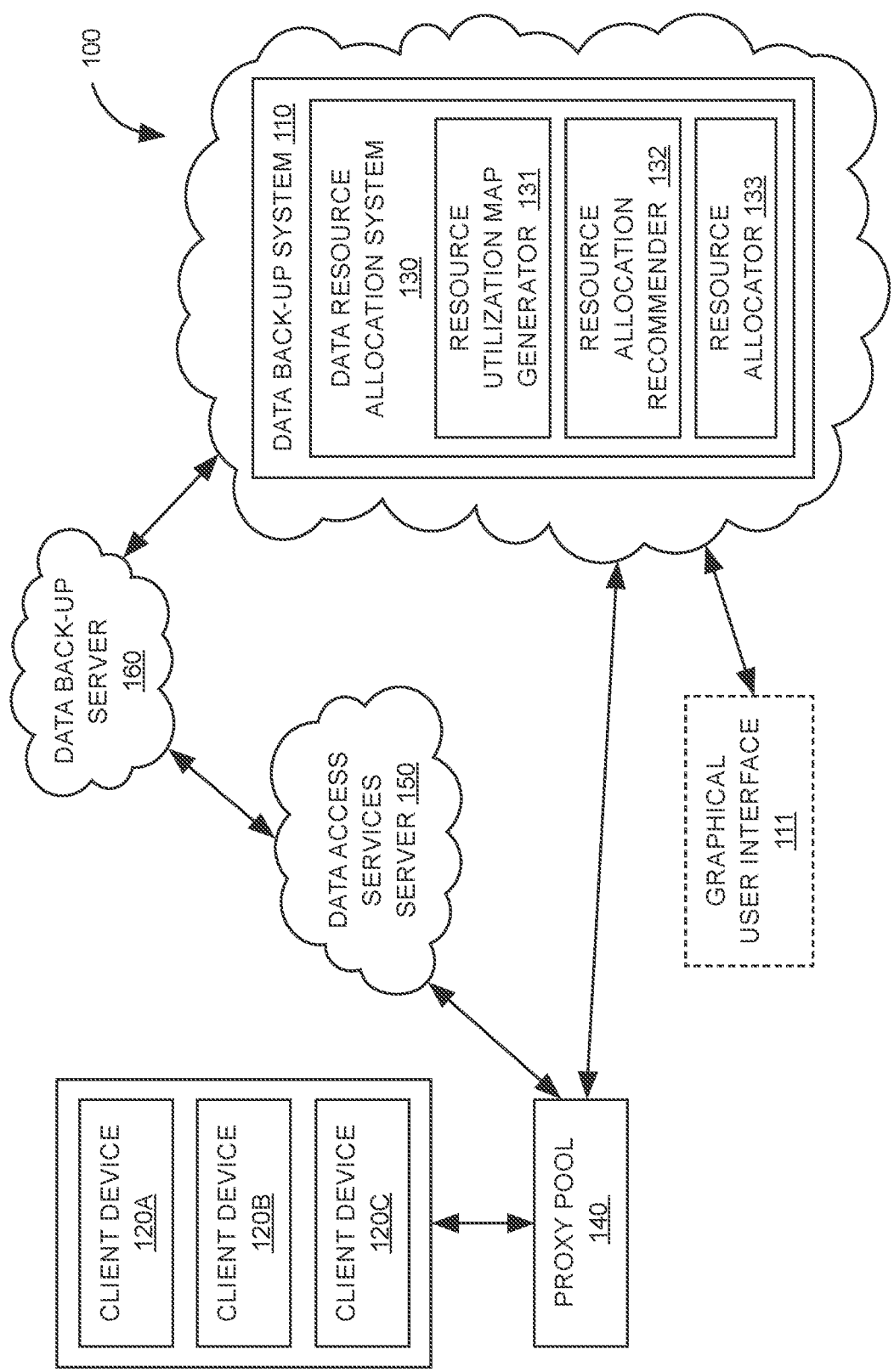
FIG. 2 is a block diagram illustrating an example data backup/restore system environment, according to some aspects of the present description.

FIG. 2 is a block diagram of an example data backup/restore environment 100 including the data backup/restore system 110, in accordance with some embodiments of the present description. FIG. 2 shows three client devices 120A, 120B, and 120C for illustration purposes only, and as mentioned earlier, the data backup/restore system environment 100 may include any number of devices. The data backup/restore system environment 100 further includes a proxy pool 140, data access services 150, and a cloud-based data backup server 160. As shown in FIG. 2, the data backup/restore system 100 further includes a dynamic resource allocation system 130 including a resource allocation map generator 131, a resource allocator recommender 132, and a resource allocator 133. Each of these components will be described in detail below with reference to FIG. 3.

Figure 3:
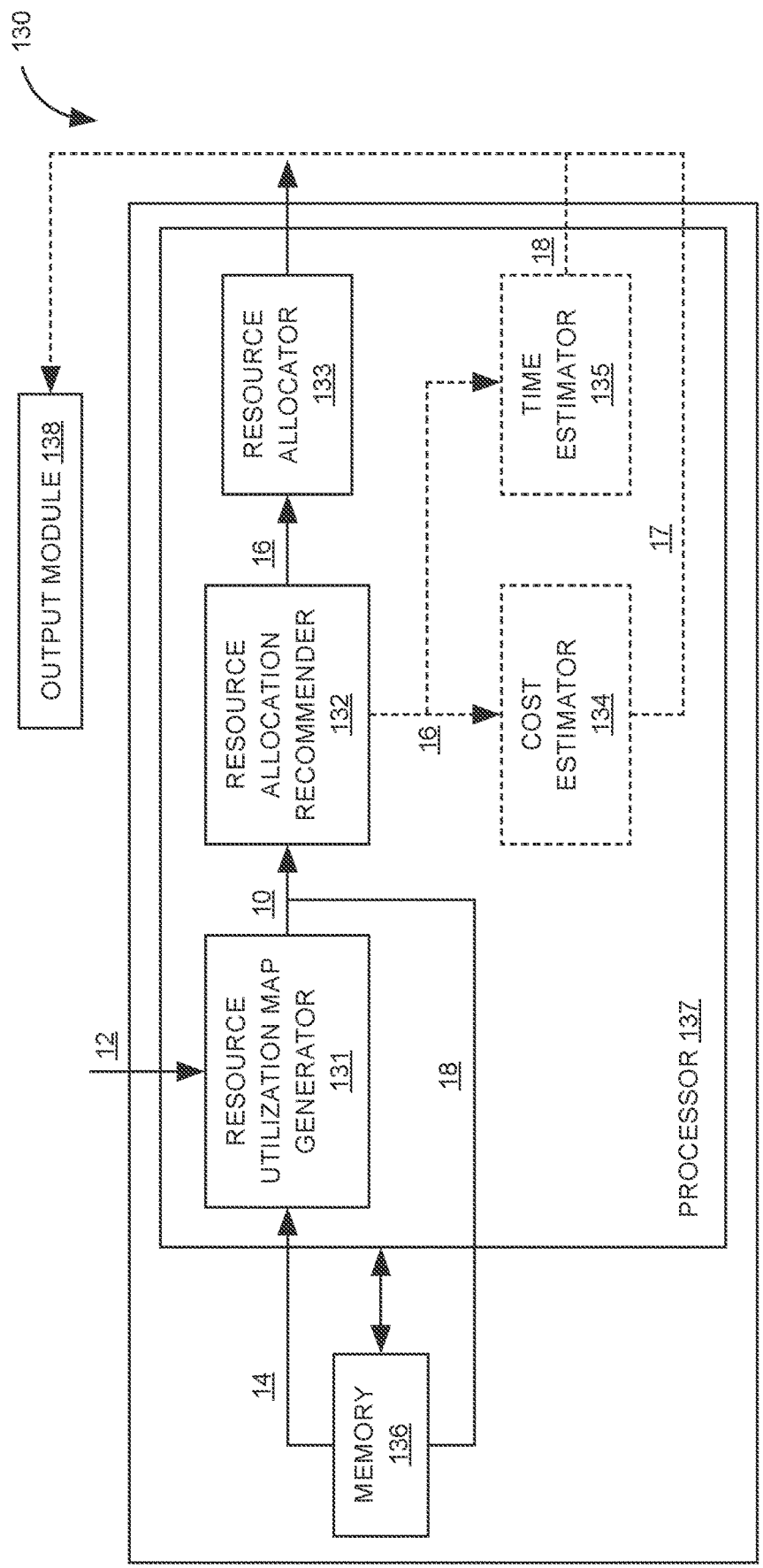
FIG. 3 is a block diagram illustrating an example dynamic resource allocation system, according to some aspects of the present description.

FIG. 3 is a block diagram of an example dynamic resource allocation system 130, in accordance with some embodiments of the present description. As shown in FIG. 3, the dynamic resource allocation system 130 includes a resource allocation map generator 131, a resource allocator recommender 132, and a resource allocator 133.

The resource allocation map generator 131 is configured to generate a resource allocation map 10 for the current data backup and/or restore based on a mathematical model, real-time operating data 12 corresponding to operating states of one or more resources in the data backup and/or restore environment 100, and historical data 14 corresponding to data back-up and restore of one or more historical backup/restore data sets.

Non-limiting examples of suitable mathematical models include regression models, classification models, optimization algorithms, packing algorithms, and/or AI/ML models such as decision trees, clustering, neural networks, etc. The real-time operating data 14 may be recorded using any suitable techniques, for example, open telemetry.

The one or more historical backup/restore data sets may correspond to data from the same or a different client device as the one being currently backed up/restored. Further, in some instances, the one or more historical backup/restore data sets may correspond to data from a different client. Moreover, the historical backup/restore data sets may correspond to an incremental backup or a full backup. The historical backup/restore data sets may be stored in a memory 136 (as shown in FIG. 3) or a cloud-based service (not shown in FIGs.), and may be accessed by the resource allocation map generator 131.

Non-limiting examples of historical data include client device parameters, proxy parameters, file system parameters, data backup system parameters, data backup server parameters, network parameters, parallelization parameters, dataset type, dataset size, day of the week, time of the day, and time taken for data backup and/or restore for the training datasets.

Client device parameters may include, for example, CPU, IO bandwidth, network bandwidth, memory device IOs, Device NW throughput, and the like. Proxy parameters may include, for example, number of proxies, proxy CPUs, proxy memory, proxy NW bandwidth, and the like. File system parameters may include, for example, Read FS minimum concurrency, maximum percentage memory, data channel size, and the like. Data backup system parameters may include, for example, internal back up systems' performance on read, write, merge, concurrency, channel size, etc. Data backup server parameters may include, for example, AWS parameters such as instance type, instance size, availability zone, etc.

Network parameters may include, for example, network requests, number of read APIs for each session, number of write APIs for each session, and the like. Parallelization parameters may include, for example, number of parallel backups, number of parallel restores, and the like. The historical data may further include metadata such as type of operation (backup/restore), operation status (success/failure), dataset type, dataset size, day of the week, time of the day, and time taken for data backup and/or restore.

Referring again to FIG. 3, the resource allocation recommender 132 is configured to generate a recommendation 16 for resource allocation for the current data backup and/or restore based on the resource allocation map 10 and a threshold value corresponding to a particular resource 18. The threshold value 18 may be stored in a database (for example, in a memory as shown in FIG. 3) that may be accessed by the resource allocation recommender.

In some embodiments, the resource allocation recommender 132 is configured to generate a recommendation for dynamic resource allocation by optimizing a speed of data backup and/or resource for a particular resource allocation. In some embodiments, the resource allocation recommender 133 is configured to generate a recommendation for dynamic resource allocation corresponding to cloud storage performance, cloud processing performance, or client-side proxy allocation.

The resource allocator 133 is configured to dynamically initiate a change in resource allocation based on the generated recommendation 16. The allocation recommendation may also be presented as an output to a user via an output module 138, as shown in FIG. 3. The output can be presented to user in multiple ways, such as, for example, GUI, API, integration to event management systems, messaging/alerting systems, ticket management systems, virtualization platforms, etc. In some embodiments, the resource allocation recommender 132 is further configured to generate a recommendation for client-side resource allocation for a future data backup and/or restore.

The recommended allocation may be further used to estimate a cost for data backup/restore in accordance with some embodiments of the present description. As shown in FIG. 3, the dynamic resource allocation system 130 optionally further includes a cost estimator 134 configured to estimate a cost 17 for the data backup and/or restore of the backup data based on the recommended resource allocation 16. The estimated cost may also be presented as an output to a user via the output module 138, as shown in FIG. 3.

The recommended allocation may be further used to estimate a time for data backup/restore in accordance with some embodiments of the present description. As shown in FIG. 3, the dynamic resource allocation system 130 optionally further includes a time estimator 135 configured to estimate a time 18 for the data backup and/or restore of the backup data based on the recommended resource allocation 16. The estimated time may also be presented as an output to a user via the output module 138, as shown in FIG. 3.

Referring again to FIG. 3, the dynamic resource allocation system 130 further includes a memory 136 storing one or more processor-executable routines, and a processor 137. The processor 137 is further configured to execute the processor-executable routines to perform the steps illustrated in the flow-chart of FIG. 4.

Figure 4:
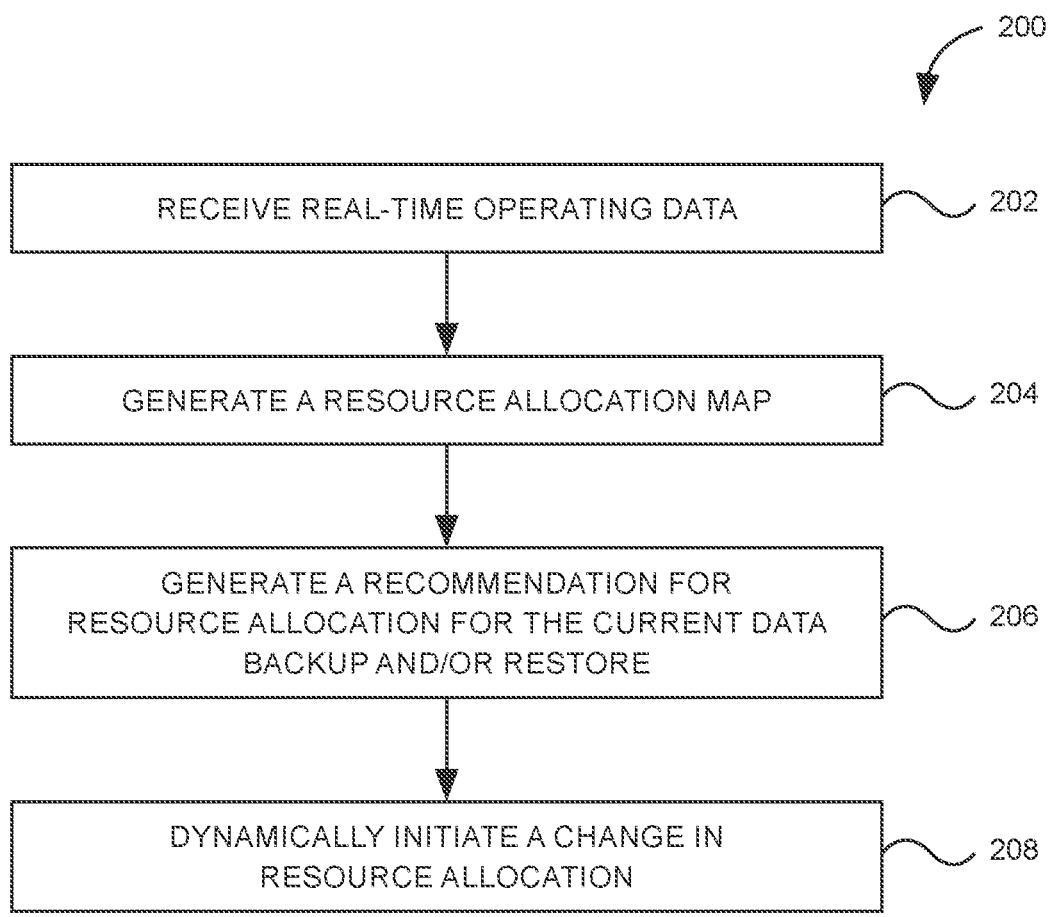
FIG. 4 is a flow chart illustrating a method for dynamically allocating resources for data backup/restore, according to some aspects of the present description.

FIG. 4 is a flowchart illustrating a method 200 for dynamic resource allocation during a data backup and/or restore of backup data in a data backup and/or restore environment. The method 200 may be implemented using the dynamic resource allocation system 130 of FIG. 3 according to some aspects of the present description. Each step of the method 200 is described in detail below.

The method 200 includes, at block 202, receiving real-time operating data corresponding to operating states of one or more resources in the data backup and/or restore environment. The real-time operating data may be recorded using any suitable techniques, for example, open telemetry.

The method 200 further includes, at block 204, generating a resource allocation map for the current data backup and/or restore based on a mathematical model, the real-time operating data, and historical data corresponding to data back-up and restore of one or more historical backup/restore datasets.

Non-limiting examples of suitable mathematical models include regression models, classification models, optimization algorithms, packing algorithms, and/or AI/ML models such as decision trees, clustering, neural networks, etc. The one or more historical backup/restore data sets may correspond to data from the same or a different client device as the one being currently backed up/restored. Further, in some instances, the one or more historical backup/restore data sets may correspond to data from a different client. Moreover, the historical backup/restore data sets may correspond to an incremental backup or a full backup. The historical backup/restore data sets may be stored in a memory or a cloud-based service.

Non-limiting examples of historical data include client device parameters, proxy parameters, file system parameters, data backup system parameters, data backup server parameters, network parameters, parallelization parameters, dataset type, dataset size, day of the week, time of the day, and time taken for data backup and/or restore for the training datasets.

Client device parameters may include, for example, CPU, IO bandwidth, network bandwidth, memory device IOs, Device NW throughput, and the like. Proxy parameters may include, for example, number of proxies, proxy CPUs, proxy memory, proxy NW bandwidth, and the like. File system parameters may include, for example, Read FS minimum concurrency, maximum percentage memory, data channel size, and the like. Data backup system parameters may include, for example, internal systems' performance on read, write, merge, concurrency, channel size, etc. Data backup server parameters may include, for example, AWS parameters such as instance type, instance size, availability zone, etc.

Network parameters may include, for example, network requests, number of read APIs for each session, number of write APIs for each session, and the like. Parallelization parameters may include, for example, number of parallel backups, number of parallel restores, and the like. The historical data may further include metadata such as type of operation (backup/restore), operation status (success/failure), dataset type, dataset size, day of the week, time of the day, and time taken for data backup and/or restore.

At block 206, the method 200 further includes generating a recommendation for resource allocation for the current data backup and/or restore based on the resource allocation map and a threshold value corresponding to a particular resource.

In some embodiments, the method 200 includes generating a recommendation for dynamic resource allocation by optimizing a speed of data backup and/or resource for a particular resource allocation. In some embodiments, the method 200 includes generating a recommendation for dynamic resource allocation corresponding to cloud storage performance, cloud processing performance, or client-side proxy allocation.

The method 200 further includes, at block 208, dynamically initiating a change in resource allocation based on the generated recommendation. The allocation recommendation may also be presented as an output to a user via an output module. The output can be presented to user in multiple ways, such as, for example, GUI, API, integration to event management systems, messaging/alerting systems, ticket management systems, virtualization platforms, etc. In some embodiments, the method 200 further includes generating a recommendation for client-side resource allocation for a future data backup and/or restore.

The recommended allocation may be further used to estimate a cost for data backup/restore in accordance with some embodiments of the present description. The recommended allocation may be further used to estimate a time for data backup/restore in accordance with some embodiments of the present description. The estimated cost and/or time may also be presented as an output to a user via the graphical user interface.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 5:
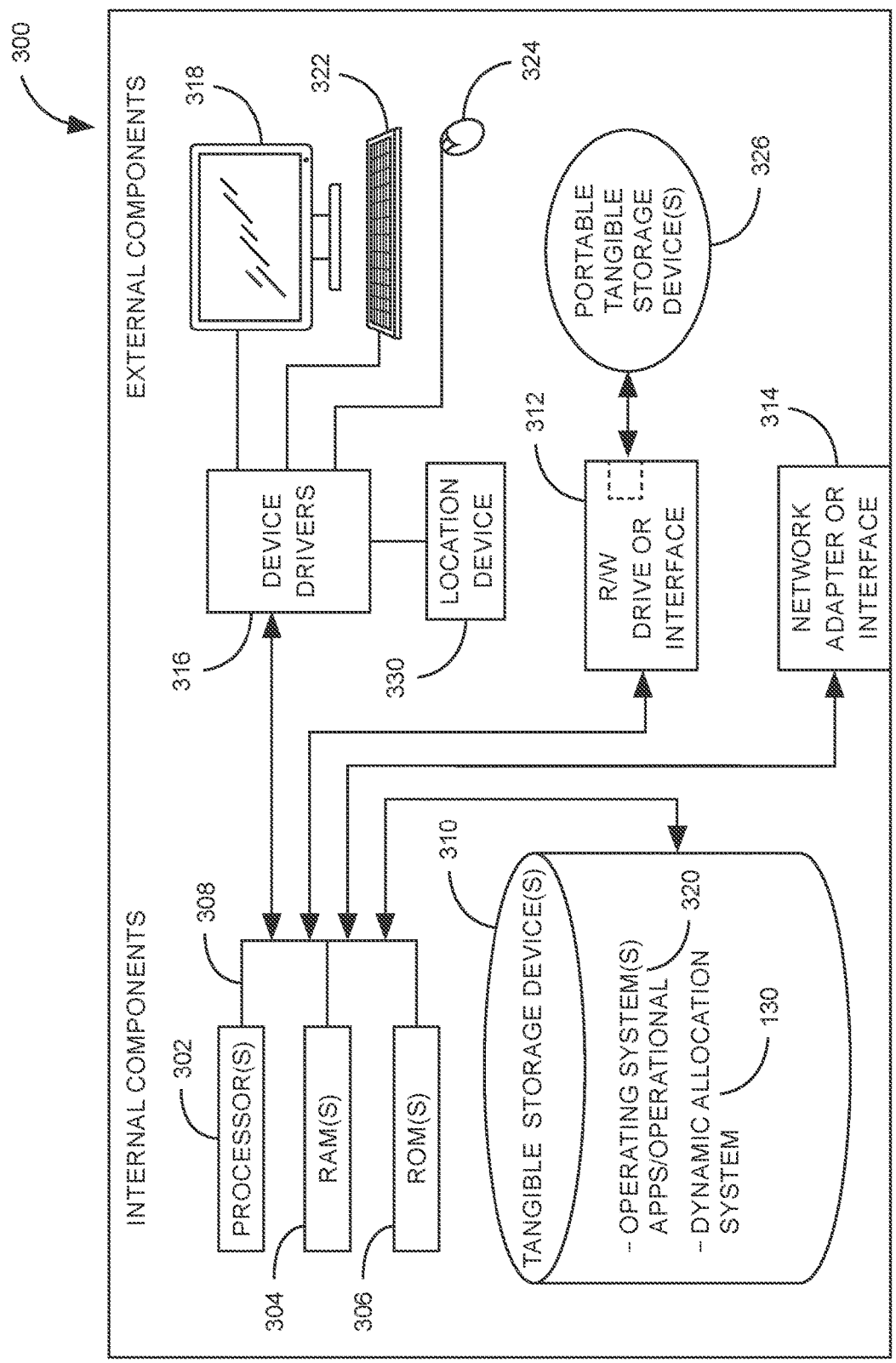
FIG. 5 is a block diagram illustrating an example computer system, according to some aspects of the present description.

One example of a computing system 300 is described below in FIG. 5. The computing system 300 includes one or more processor 302, one or more computer-readable RAMs 304 and one or more computer-readable ROMs 306 on one or more buses 308. Further, the computer system 308 includes a tangible storage device 310 that may be used to execute operating systems 320 and the dynamic resource allocation system 130. Both, the operating system 320 and dynamic resource allocation system 130 are executed by processor 302 via one or more respective RAMs 304 (which typically includes cache memory). The execution of the operating system 320 and/or the dynamic resource allocation system by the processor 302, configures the processor 302 as a special-purpose processor configured to carry out the functionalities of the operating system 320 and/or the dynamic resource allocation system, as described above.

Examples of storage devices 310 include semiconductor storage devices such as ROM 506, EPROM, flash memory or any other computer-readable tangible storage device that may store a computer program and digital information.

Computer system 300 also includes a R/W drive or interface 312 to read from and write to one or more portable computer-readable tangible storage devices 326 such as a CD-ROM, DVD, memory stick or semiconductor storage device. Further, network adapters or interfaces 314 such as a TCP/IP adapter cards, wireless Wi-Fi interface cards, or 3G or 4G wireless interface cards or other wired or wireless communication links are also included in the computer system 300.

In one example embodiment, the dynamic resource allocation system 130 may be stored in tangible storage device 310 and may be downloaded from an external computer via a network (for example, the Internet, a local area network or another wide area network) and network adapter or interface 314.

Computer system 300 further includes device drivers 316 to interface with input and output devices. The input and output devices may include a computer display monitor 318, a keyboard 322, a keypad, a touch screen, a computer mouse 324, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

The invention claimed is:

1. A system for dynamic resource allocation during a data backup and/or restore of a backup data in a data backup and/or restore environment, the system comprising:
   a memory storing one or more processor-executable routines; and
   a processor communicatively coupled to the memory, the processor configured to execute the one or more processor-executable routines to:
   receive real-time operating data of one or more resources in the data backup and/or restore environment, each resource comprising a capability in the backup and/or restore environment for use in the data backup and/or restore, the capability being one of a client device, a proxy pool, a data backup server, and/or a network connecting two of more of the client device, proxy, and data backup server;
   generate a resource allocation map for the current data backup and/or restore based on a mathematical model, the real-time operating data, and historical resource usage data corresponding to data back-up and restore of one or more datasets, the resource allocation map identifying resources in the backup and/or restore environment for use in the data backup and/or restore;
   generate, by optimizing a speed of data backup and/or restore for a particular resource allocation, a recommendation for resource allocation for the current data backup and/or restore based on the resource allocation map and a threshold value corresponding to a particular resource as required for the data backup and/or restore, the recommendation identifying resources for use in the current data backup and/or restore; and
   dynamically initiate a change in resource allocation based on the generated recommendation,
   wherein the historical resource usage data comprises client device parameters, proxy parameters, file system parameters, data backup system parameters, data backup server parameters, network parameters, parallelization parameters, dataset type, dataset size, day of the week, time of the day, and time taken for data backup and/or restore for the datasets.

2. The system of claim 1, wherein the processor is configured to execute the one or more processor-executable routines to generate the recommendation for dynamic resource allocation corresponding to cloud storage performance, cloud processing performance, or client-side proxy allocation.

3. The system of claim 1, wherein the processor is further configured to execute the one or more processor-executable routines to estimate a cost for the data backup and/or restore of the backup data based on the recommended resource allocation.

4. The system of claim 1, wherein the processor is further configured to execute the one or more processor-executable routines to estimate a time taken for data backup and/or restore based on the recommended resource allocation.

5. The system of claim 1, wherein the processor is further configured to execute the one or more processor-executable routines to generate a recommendation for client-side resource allocation for a future data back up and/or restore.

6. A method for dynamic resource allocation during a data backup and/or restore of backup data in a data backup and/or restore environment, the method comprising:
   receiving real-time operating data of one or more resources in the data backup and/or restore environment, each resource comprising a capability in the backup and/or restore environment for use in the data backup and/or restore, the capability being one of a client device, a proxy pool, a data backup server, and/or a network connecting two of more of the client device, proxy, and data backup server;
   generating a resource allocation map for the current data backup and/or restore based on a mathematical model, the real-time operating data, and historical resource usage data corresponding to data back-up and restore of one or more datasets, the resource allocation map identifying resources in the backup and/or restore environment for use in the data backup and/or restore;
   generating by optimizing a speed of data backup and/or restore for a particular resource allocation, a recommendation for resource allocation for the current data backup and/or restore based on the resource allocation map and a threshold value corresponding to a particular resource as required for the data backup and/or restore, the recommendation identifying resources for use in the current data backup and/or restore; and dynamically initiating a change in resource allocation based on the generated recommendation,
wherein the historical resource usage data comprises client device parameters, proxy parameters, file system parameters, data backup system parameters, data backup server parameters, network parameters, parallelization parameters, dataset type, dataset size, day of the week, time of the day, and time taken for data backup and/or restore for the datasets.

7. The method of claim 6, further comprising generating the recommendation for dynamic resource allocation corresponding to cloud storage performance, cloud processing performance, or client-side proxy allocation.

8. The method of claim 6, further comprising estimating a cost for the data backup and/or restore of the backup data based on the recommended resource allocation.

9. The method of claim 6, further comprising estimating a time taken for data backup and/or restore based on the recommended resource allocation.

10. The method of claim 6, further comprising generating a recommendation for client-side resource allocation for a future data backup and/or restore.

* * * * *